Dec. 17, 1940.                C. A. KOERNER                2,225,175
                               MOTOR SHUTOFF

Filed May 1. 1939

INVENTOR
Charles A. Koerner.
BY
Arthur C. Brown
ATTORNEY

Patented Dec. 17, 1940

2,225,175

UNITED STATES PATENT OFFICE 2,225,175

MOTOR SHUTOFF

Charles A. Koerner, Wakefield, Kans.

Application May 1, 1939, Serial No. 270,976

5 Claims. (Cl. 123—196)

This invention relates to a motor shutoff, and more particularly to a device of that character in which air acts to automatically shut off an internal combustion motor in response to dissipation of the lubricating oil supply of the motor.

The principal objects of the present invention are to provide a safety device for preventing burning out the motor bearings, connecting rods and the like, when the lubrication system for the motor becomes ineffective; to provide a durable, economical and efficient device of this character which is of positive and simple operation; and to provide improved elements and arrangement of elements in a device of this character.

In accomplishing these and other objects of the present invention, I have provided improved details of structure, the preferred form of which is illustrated in the accompanying drawing, wherein.

Figure 1:
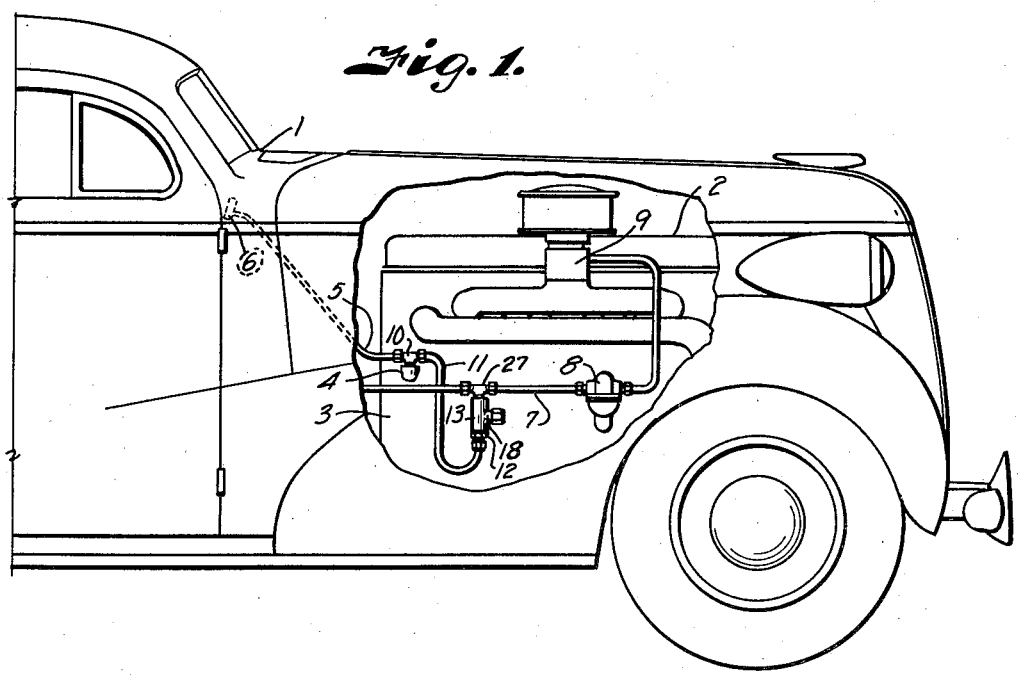
Fig. 1 is a side elevational view of a motor vehicle with the hood cut away to show an application of a device embodying the present invention to the motor.

Referring more in detail to the drawing:

1 designates a conventional motor vehicle having an internal combustion motor or engine 2, provided with a lubricating system for its bearings, connecting rods, and other wearing parts of the motor, which parts are usually supplied with lubricating oil carried in the crank case reservoir forming a part of the motor block 3. An outlet 4 is usually provided in the block in communication with the lubricating oil reservoir and having a line 5 leading to an oil gage 6 on the dash in the operator's compartment of the vehicle for indicating the condition of the oil supply.

A fuel line 7 normally is provided for the motor leading from a suitable source of fuel supply through a fuel pump 8 to a carburetor 9, which regulates feed of fuel to the motor cylinders, not shown.

10 designates a connection, for example a T, for connecting the gage line 5 with the reservoir outlet 4, the remaining end of the T being fitted with an oil line 11 leading to the safety device which is connected in the fuel line 7. The fuel line end of the oil line is preferably provided with a threaded nipple 12 engaged with an internally threaded end of a valve housing 13 interposed between the oil and fuel lines.

Figure 3:
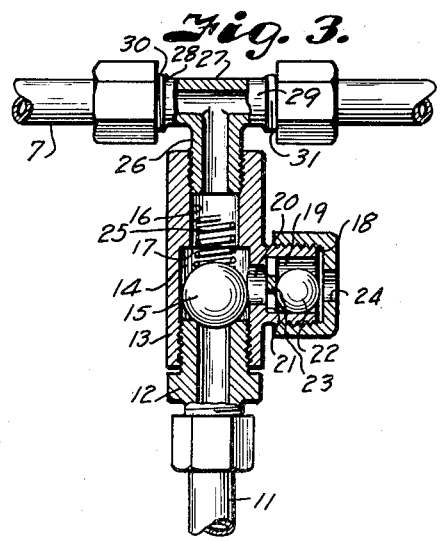
Fig. 3 is a view similar to Fig. 2, showing the valves in open condition.
Figure 4:
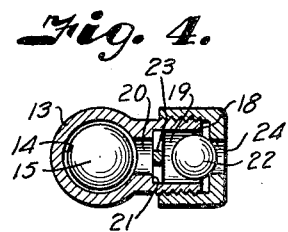
Fig. 4 is a horizontal cross-section through the motor shutoff substantially on the line 4—4, Fig. 2.

The housing 13 has a valve chamber 14 therein, which preferably contains a ball valve 15, as shown in Fig. 3. The valve housing is preferably further provided with a reduced partly threaded bore 16 at its upper end forming a seat 17, on which the ball valve 15 seats under oil pressure.

18 designates a preferably laterally disposed extension on the valve housing having a channel 19 communicating with the valve chamber 14 through a passage 20 that is reduced in size relative to the channel 19 to form a shoulder 21 for limiting inward movement of a ball or like valve 22 and preventing its interference with the ball valve 15. A spider or the like 23 is preferably mounted in the channel in engagement with the shoulder 21 for precluding jamming or accidental closure of the passage 20 by the ball valve 22, and a cap member is preferably threadedly mounted on the extension for limiting outward movement of the ball valve 22 relative to the channel 19, the cap member having an air inlet opening 24 allowing communication between the valve chamber 14, channel 19 and atmosphere.

A coil spring 25 is preferably provided to urge the ball valve 15 toward the nipple 12 and break the seal between the ball valve 15 and its seat 17, the spring being arranged within the bore 16 of the housing and bearing at its upper end on the lower end of a channeled branch 26, which is preferably threadedly mounted in supporting relation to the valve housing.

Figure 2:
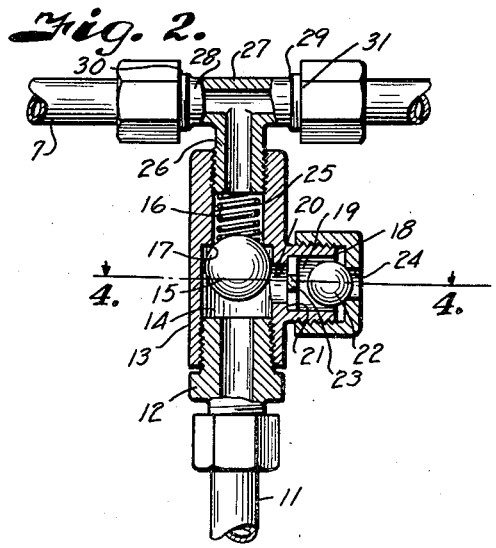
Fig. 2 is a detail vertical cross-section through the device embodying this invention, showing the valves in closed condition.

The branch 26 preferably forms part of a T fitting 27, the other communicatably channeled runs 28 and 29 of which are respectively engaged as at 30 and 31, with separated portions of the fuel line 7, as shown in Figs. 2 and 3.

The operation of an internal combustion motor equipped with a motor shutoff constructed as described is as follows:

Assuming the lubricating system of the motor to be adequately supplied, actuation of the motor places the system under an agitation pressure sufficient to force the lubricant from the block through the oil line 11 to unseat the ball valve 15 against pressure of the spring for closing the bore 16 of the valve housing. The oil under pressure also acts on the ball valve 22 to close the air inlet opening 24 against atmospheric pressures. The valves thus remain closed throughout the normal operation of the motor.

When, however, the lubricating system becomes ineffective, for example as by dissipation of the oil in the crank case of the engine, line breakage or failure of the pump, insufficient pressure exists to maintain the ball valves closed. The spring 25 then comes into play to force the ball valve downwardly onto its seat on the nipple 12 and atmospheric pressures act to move the ball valve 22 inwardly in such a manner that air passes through the channel 19, passage 20, valve chamber 14 and bore 16 into the fuel line 7, where it passes through the fuel pump to the carburetor. Admission of air to the pump substantially immediately stops flow of fuel to the motor and the motor consequently stalls.

It is then necessary to replenish the supply of lubricant before the motor can again function, and damage to the bearings, connecting rods and the like is thus prevented. With a fresh supply of oil adequate pressure is generated in turning over the motor, as by the vehicle ignition system, self-starter, to again close the ball valves, exclude air, and allow fuel to be again normally pumped to the cylinders in the usual manner.

It is apparent, therefore, that an efficient safety device and motor shutoff is provided by the present invention, which is automatic and positive in operation, which is easily installed, and which prevents damage to the motor through lack of adequate lubrication.

While the motor shutoff embodying my invention has been illustrated in connection with the motor of a vehicle of multi-passenger type, it is apparent that the device may also be applied to truck and tractor motors and stationary internal combustion engines with equal facility, and with the production of the same beneficial results, regardless of the particular type of motor with which it is employed.

What I claim and desire to secure by Letters Patent is:

1. In combination with an internal combustion engine having a lubrication system, a fuel pump and a fuel line, a line leading from the lubrication system to said fuel line normally communicating with atmosphere, means responsive to normal actuation of the lubrication system for closing communication between the fuel and lubrication lines and atmosphere, and means in said lubrication line responsive to failure of said lubrication system for effecting communication between said fuel line and atmosphere.

2. In combination with an internal combustion engine having lubrication and fuel supply systems, a line normally connecting said systems with atmosphere, a valve housing in said line, and a valve in said housing closing said line to atmosphere in response to normal operation of the lubrication system and opening said line to atmosphere in response to failure of said system.

3. In combination with an internal combustion engine having lubrication and fuel supply systems, a line connecting said systems, a valve housing in said line having a seat, a channel in said line on the fuel system side of said seat leading to atmosphere, and valves closing said line and channel respectively in response to normal operation of the lubrication system, said valves being movable to open position in response to failure of the lubrication system for passing air into the fuel system to stop the engine.

4. In combination with an internal combustion engine having lubrication and fuel supply systems, a line connecting said systems, a valve housing in said line having a seat, a channel in said line on the fuel system side of said seat leading to atmosphere, valves closing said line and channel respectively in response to normal operation of the lubrication system, said valves being movable to open position in response to failure of the lubrication system for passing air into the fuel system to stop the engine, and resilient means normally urging one of said valves to line opening position relative to atmosphere.

5. In combination with an internal combustion engine having lubrication and fuel supply systems, a line connecting said systems, a valve housing in said line having a seat, a channel in in said line on the fuel system side of said seat leading to atmosphere, valves closing said line and channel respectively in response to normal operation of the lubrication system, said valves being movable to open position in response to failure of the lubrication system for passing air into the fuel system to stop the engine, and means maintaining said valves in operative positions relative to said valve housing and channel respectively.

CHARLES A. KOERNER.